US012337356B2

(12) United States Patent
Son et al.

(10) Patent No.: US 12,337,356 B2
(45) Date of Patent: Jun. 24, 2025

(54) MOVING ASSEMBLY FOR RECOVERY GUARD AND SUBSTRATE PROCESSING APPARATUS

(71) Applicant: SEMES CO., LTD., Chungcheongnam-do (KR)

(72) Inventors: Won Sik Son, Chungcheongnam-do (KR); Pil Kyun Heo, Chungcheongnam-do (KR); Ho Jong Hwang, Chungcheongnam-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 272 days.

(21) Appl. No.: 18/201,934

(22) Filed: May 25, 2023

(65) Prior Publication Data

US 2023/0405648 A1 Dec. 21, 2023

(30) Foreign Application Priority Data

Jun. 16, 2022 (KR) ........................ 10-2022-0073711

(51) Int. Cl.
*B08B 13/00* (2006.01)
*B08B 3/04* (2006.01)

(52) U.S. Cl.
CPC ................ *B08B 13/00* (2013.01); *B08B 3/04* (2013.01)

(58) Field of Classification Search
None
See application file for complete search history.

(56) References Cited

U.S. PATENT DOCUMENTS

2017/0232485 A1 8/2017 Hashimoto

FOREIGN PATENT DOCUMENTS

| | | |
|---|---|---|
| JP | 10-43660 | 2/1998 |
| KR | 10-1909185 | 10/2018 |
| KR | 10-2007558 | 8/2019 |
| KR | 10-2021-0055088 | 5/2021 |
| KR | 10-2022-0015668 | 2/2022 |

(Continued)

OTHER PUBLICATIONS

KR 20220015668 A machine translation, Substrate Processiong Apparatus Supplying and Recovering Processing Liquid, Jung (Year: 2022).*

(Continued)

*Primary Examiner* — Cristi J Tate-Sims
(74) *Attorney, Agent, or Firm* — WOMBLE BOND DICKINSON (US) LLP

(57) ABSTRACT

The moving assembly for a recovery guard includes a recovery vessel including a first recovery vessel disposed to surround a substrate support and a second recovery vessel disposed inside of the first recovery vessel, concentrically with respect to the first recovery vessel, and a lifting driver connected to the first and second recovery vessels and elevating the first and second recovery vessels. The lifting driver includes a motor, a drive shaft connected to the motor and rotated in a first direction, a first shaft connected to the first recovery vessel and extending in a second direction, perpendicular to the first direction, a second shaft connected to the second recovery vessel and extending in the second direction, a first clutch connecting the drive shaft and the first shaft, and a second clutch connecting the drive shaft and the second shaft.

20 Claims, 10 Drawing Sheets

(56) References Cited

FOREIGN PATENT DOCUMENTS

| | | |
|---|---|---|
| KR | 10-2022-0016416 | 2/2022 |
| WO | 2020/068343 | 4/2020 |

OTHER PUBLICATIONS

KR 0150988 B1 machine translation, Rotation and Up-Down Apparatus, Moon (Year: 1998).*
Office Action dated Sep. 6, 2023 for Korean Patent Application No. 10-2022-0073711 and its English translation by Google Translate.

* cited by examiner

MOVING ASSEMBLY FOR RECOVERY GUARD AND SUBSTRATE PROCESSING APPARATUS

CROSS-REFERENCE TO RELATED APPLICATION(S)

This application claims benefit of priority to Korean Patent Application No. 10-2022-0073711 filed on Jun. 16, 2022 in the Korean Intellectual Property Office, the disclosure of which is incorporated herein by reference in its entirety.

BACKGROUND

1. Field

The present disclosure relates to a moving assembly for a recovery guard used in a substrate processing apparatus for supplying and recovering a processing liquid, and more particularly, to a moving assembly for a recovery guard for adjusting a height of the recovery vessel for recovering a treatment liquid and a substrate processing method.

2. Description of Related Art

A semiconductor (or display) manufacturing process is a process for manufacturing a semiconductor device on a substrate (e.g., a wafer), and includes, for example, exposure, deposition, etching, ion implantation, cleaning, and the like. In detail, various organic and inorganic foreign substances are present on the substrate. Therefore, in order to improve manufacturing yield, it is significantly important to effectively remove foreign substances on the substrate.

A cleaning process using a treatment liquid (a cleaning liquid) is mainly used to remove foreign substances. The cleaning process may be performed by supplying a treatment liquid to the upper or rear surface of the substrate while rotating a spin chuck supporting the substrate, and after the cleaning process, a rinsing process using a rinse liquid and a drying process using drying gas are performed.

On the other hand, it is necessary to recover the treatment liquid supplied to the substrate, for discharge or reuse. To recover the treatment liquid scattered from the substrate, a recovery vessel (a cup or bowl) formed around the substrate may be provided. In order to effectively recover the treatment liquid, the recovery vessel moves up and down to a higher position than the position of the substrate according to the supply timing of the treatment liquid. Equipment as in Patent Documents 1 and 2 is known as a substrate processing apparatus including a configuration for adjusting the height of a recovery vessel.

On the other hand, in order to increase the efficiency of the substrate processing process, the smaller the substrate processing apparatus is, the more advantageous it is. As the device is reduced in size, the configuration for adjusting the height of the recovery vessel also needs to be reduced accordingly. However, Patent Document 1 has a limitation that the height of the device is increased by the combination of a cylinder and a motor, and the lifting and lowering by the cylinder does not ensure uniformity of lifting and lowering. In the case of Patent Document 2, there is a limitation that it is not suitable for miniaturized equipment by matching individual recovery vessels to individual processing containers.

SUMMARY

An aspect of the present disclosure is to provide a moving assembly for a recovery guard and a substrate processing apparatus, which may be installed in a relatively narrow space and are easily controlled.

According to an aspect of the present disclosure, a moving assembly for a recovery guard and a substrate processing apparatus are provided.

According to an aspect of the present disclosure, a moving assembly for a recovery guard includes a recovery vessel including a first recovery vessel disposed to surround a substrate support and a second recovery vessel disposed inside of the first recovery vessel, concentrically with respect to the first recovery vessel; and a lifting driver connected to the first and second recovery vessels and elevating the first and second recovery vessels. The lifting driver includes a motor; a drive shaft connected to the motor and rotated in a first direction; a first shaft connected to the first recovery vessel and extending in a second direction, perpendicular to the first direction; a second shaft connected to the second recovery vessel and extending in the second direction; a first clutch connecting the drive shaft and the first shaft; and a second clutch connecting the drive shaft and the second shaft.

According to an aspect of the present disclosure, a moving assembly for a recovery guard includes a recovery vessel including a first recovery vessel disposed to surround a substrate support, and a second recovery vessel disposed inside of the first recovery vessel while having the same centerline as a centerline of the first recovery vessel; and a lifting driver connected to the first and second recovery vessels and elevating the first and second recovery vessels. The lifting driver includes a motor; a drive shaft connected to the motor and rotated in a first direction; a first shaft connected to the first recovery vessel and extending in a second direction, perpendicular to the first direction; a second shaft connected to the second recovery vessel and extending in the second direction; a first clutch connected to the drive shaft and transmitting or blocking rotation of the drive shaft; a second clutch connected to the drive shaft and transmitting or blocking rotation of the drive shaft; a first pulley connected to the first clutch; a second pulley connected to the second clutch; a third pulley disposed in a position spaced apart from the first pulley in the second direction, connected to the first pulley by a first belt, and rotated together therewith; a fourth pulley disposed in a position spaced apart from the second pulley in the second direction, connected to the second pulley by a second belt, and rotated together therewith; a first brake disposed on a rotation shaft of the third pulley; and a second brake disposed on a rotation shaft of the fourth pulley. The lifting driver includes a first lifting driver disposed on one side of the first and second recovery vessels and a second lifting driver disposed in a position symmetrical to the first lifting driver with respect to the centerline.

According to an aspect of the present disclosure, a substrate processing apparatus includes a substrate support rotating while supporting a substrate; a treatment liquid supply unit supplying a treatment liquid to the substrate; and a moving assembly for a recovery guard, including a recovery vessel recovering the treatment liquid scattered from the substrate, and a lifting driver connected to the recovery vessel and elevating the recovery vessel. The recovery vessel includes a first recovery vessel surrounding the substrate support, a second recovery vessel disposed inside of the first recovery vessel concentrically with respect to the first recovery vessel, a third recovery vessel disposed inside of the second recovery vessel concentrically with respect to the first recovery vessel, and a fourth recovery vessel disposed inside of the third recovery vessel concentrically with respect to the first recovery vessel. The lifting driver includes a first lifting driver connected to the first and second recovery vessels, a second lifting driver disposed in a position symmetrical to the first lifting driver with respect to a centerline of the recovery vessel on a plane and connected to the first and second recovery vessels, a third lifting driver connected to the third and fourth recovery vessels, and a fourth lifting driver disposed in a position symmetrical to the third lifting driver with respect to a centerline of the recovery vessel and connected to the third and fourth recovery vessels. The first to fourth lifting drivers include a motor; a drive shaft connected to the motor and rotated in a first direction; a first shaft connected to the first recovery vessel and extending in a second direction, perpendicular to the first direction; a second shaft connected to the second recovery vessel and extending in the second direction; a first clutch connecting the drive shaft and the first shaft; and a second clutch connecting the drive shaft and the second shaft.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
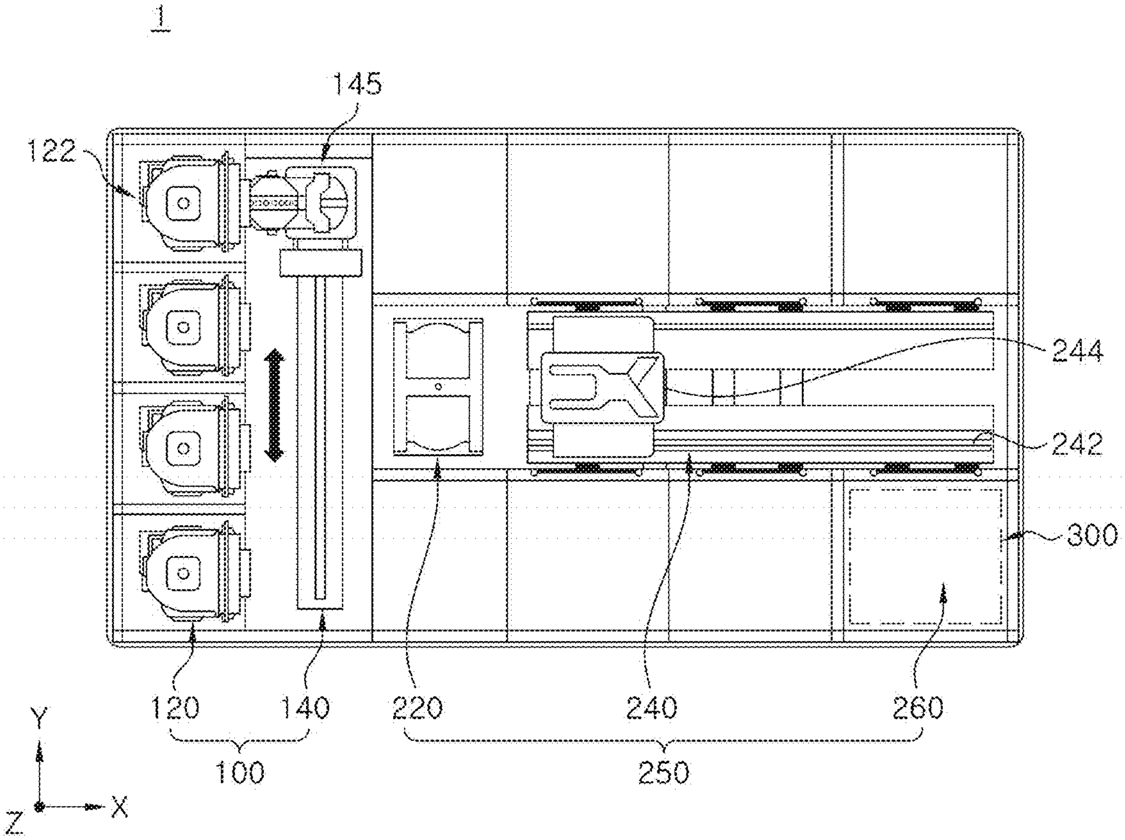
FIG. 1 is a plan view schematically illustrating a substrate processing apparatus according to an embodiment.

Hereinafter, embodiments will be described in detail such that those skilled in the art may easily practice the present disclosure with reference to the accompanying drawings. However, in describing a preferred embodiment in detail, if it is determined that a detailed description of a related known function or configuration may unnecessarily obscure the gist of the present disclosure, the detailed description will be omitted. In addition, the same reference numerals are used throughout the drawings for parts having similar functions and actions. In addition, in the present specification, terms such as 'on,' 'upper portion,' 'upper surface,' 'below,' 'lower portion,' 'lower surface,' 'side' and the like are based on the drawings, and may be changed depending on the direction in which components are actually disposed.

In addition, throughout the specification, when a portion is said to be 'connected' to another part, it is not only 'directly connected,' but also 'indirectly connected' with other components therebetween. Further, 'including' a certain component means that other components may be further included, rather than excluding other components unless otherwise stated.

The present disclosure may be embodied in many different forms and is not limited to the embodiments set forth herein.

FIG. 1 is a plan view schematically illustrating a substrate processing apparatus according to an embodiment. Referring to FIG. 1, a substrate processing apparatus 1 includes an index unit 100 and a process processing unit 200.

The index unit 100 may include a load port 120 and an index chamber 140. The load port 120, the index chamber 140, and the processing unit 250 may be sequentially arranged in a line. Hereinafter, the direction in which the load port 120, the index chamber 140, and the processing unit 250 are arranged is referred to as a first direction X. When viewed from above, a direction perpendicular to the first direction X is referred to as a second direction (Y), and a direction perpendicular to the plane including the first direction X and the second direction (Y) is referred to as a third direction (Z).

A carrier 122 in which a substrate is accommodated is seated in the load port 120. The load port 120 may be provided as a plurality of load ports, and the plurality of load ports may be disposed in a line in the second direction (Y). Although FIG. 1 illustrates that four load ports 120 are provided, the number of load ports 120 may be increased or decreased according to conditions such as process efficiency and footprint of the process unit 250. A front opening unified pod (FOUP) may be used as the carrier 122.

The index chamber 140 is located between the load port 120 and the processing unit 250. The index chamber 140 has a rectangular parallelepiped shape including a front panel, a rear panel, and both side panels, and includes an index robot 145 for transferring substrates between the carrier 122 seated in the load port 120 and the load lock chamber 220 is provided therein. Although not illustrated, the index chamber 140 may include a controlled air flow system such as vents or a laminar flow system to prevent particles from entering the internal space.

The processing unit 250 may include a load lock chamber 220, a transfer chamber 240, and a liquid processing chamber 260. The transfer chamber 240 may be disposed in such a manner that the length thereof is parallel to the first direction X. Liquid processing chambers 260 may be disposed on one side and the other side of the transfer chamber 240 in the second direction Y, respectively.

A portion of the liquid processing chambers 260 may be disposed in the length direction of the transfer chamber 240. Also, some of the liquid processing chambers 260 may be stacked with each other.

For example, on one side of the transfer chamber 240, the liquid processing chambers 260 may be disposed in an array of A×B (where A and B are each an integer greater than or equal to 1). In this case, A is the number of liquid processing chambers 260 provided in a row in the first direction X, and B is the number of liquid processing chambers 260 provided in a row in the third direction Y. In the substrate processing apparatus 1, as the numbers of A and B increase, the number of liquid processing chambers 260 in one substrate processing apparatus 1 increases, and accordingly, relatively many substrates may be processed with one apparatus. However, increasing the number of A and B in a given space means that respective liquid processing chambers 260 are reduced in size, and it is possible to disposed a relatively large number of liquid processing chambers 260 in one substrate processing apparatus 1 only when the installation space of peripheral devices is reduced while the size of the substrate is the same.

The load lock chamber 220 is disposed between the index chamber 140 and the transfer chamber 240. The load lock chamber 220 provides a space for temporarily loading a substrate before transferring the substrate between the transfer chamber 240 and the index chamber 140. The load lock chamber 220 is provided with a slot (not illustrated) in which a substrate is disposed, and the slot is provided as a plurality of slots spaced apart from each other in the third direction Z. In the loadlock chamber 220, a surface facing the index chamber 140 and a surface facing the transfer chamber 240 may be respectively provided in an open form.

The transfer chamber 240 may transfer substrates between the load lock chamber 220 and the liquid processing chambers 260. A guide rail 242 and a main robot 244 may be provided in the transfer chamber 240. The guide rail 242 is disposed such that a longitudinal direction thereof is parallel to the first direction X. The main robot 244 is installed on the guide rail 242 and is provided to be able to move linearly in the first direction X on the guide rail 242.

A substrate processing apparatus 300 may be provided in the liquid processing chamber 260 to perform a liquid processing process on a substrate, for example, a cleaning process. For example, the cleaning process may be a process of cleaning a substrate, stripping, or removing organic residues using processing fluids containing an alcohol component. The substrate processing apparatus provided in each liquid processing chamber 260 may have a different structure depending on the type of cleaning process to be performed. Optionally, substrate processing apparatuses in respect liquid processing chambers 260 may have the same structure. Optionally, the liquid processing chambers 260 are divided into a plurality of groups, and the substrate processing apparatuses in the liquid processing chambers 260 belonging to the same group have the same structure, and substrate processing apparatuses provided in the liquid processing chambers 260 belonging to different groups may have structures different from each other. Hereinafter, an example of a substrate processing apparatus provided in the liquid processing chamber 260 will be described.

Figure 2:
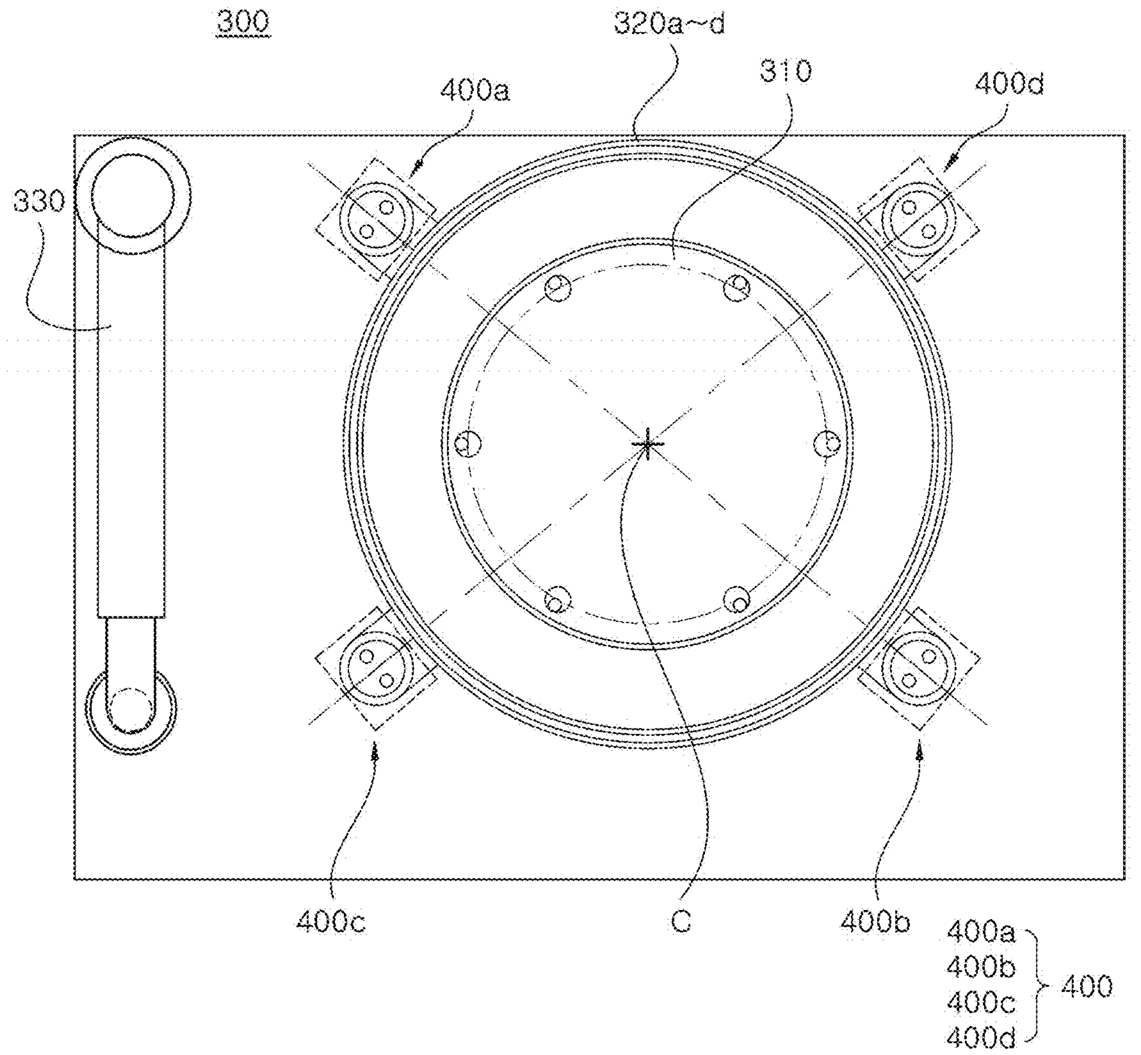
FIG. 2 is a schematic plan view of a substrate processing apparatus provided in a chamber for processing a substrate according to an embodiment.

FIG. 2 is a schematic diagram of the substrate processing apparatus 300 disposed in a liquid processing chamber 260 according to an embodiment. Referring to FIG. 2, the substrate processing apparatus 300 includes a substrate support 310 for supporting a substrate, a treatment liquid supply unit 330 for supplying a processing liquid to the substrate, and a liquid chemical recovery unit for recovering the processing liquid scattered from the substrate. The liquid chemical recovery unit may include a plurality of (e.g., four) recovery vessels 320*a-d* and a moving assembly for a recovery guard for elevating the recovery vessels 320*a-d*.

The substrate support 310 supports and rotates the substrate during the process. The substrate support 310 may include a support plate, a support pin, a chuck pin, and a rotation driving member. The support plate is provided in a substantially circular plate shape. The support pin is provided as a plurality of support pins protruding upward from the support plate to support the rear surface of the substrate.

The chuck pin is provided as a plurality of chuck pins protruding upward from the support plate to support the side of the substrate. The chuck pin supports the side of the substrate such that the substrate is not laterally displaced from the original position when the support plate is rotated. The chuck pin is provided to enable linear movement between an outer position and an inner position in the radial direction of the support plate. When the substrate is loaded or unloaded from the support plate, the chuck pin is located at an outer position, and when a process is performed on the substrate, the chuck pin is located at an inner position. The inner position is a position in which the side of the substrate and the chuck pin are in contact with each other, and the outer position is a position in which the chuck pin and the substrate are spaced apart from each other.

The rotation driving member rotates the support plate. The support plate is rotatable around a central axis by the rotation driving member. The rotation driving member includes a support shaft and a driving unit. The support shaft may have a tubular shape. An upper end of the support shaft may be fixedly coupled to a lower surface of the support plate. The driving unit provides a driving force such that the support shaft rotates. The support shaft is rotated by the driving unit, and the support plate may be rotated together with the support shaft.

The moving assembly for a recovery guard includes recovery vessels 320*a-d* and a lifting driver 400 that linearly moves the recovery vessels 320*a-d* in a third direction (Z), and as the recovery vessels 320*a-d* move up and down, the relative heights of the recovery vessels 320*a-d* with respect to the support plate are changed. The moving assembly for a recovery guard lowers the recovery vessels 320*a-d* by the lifting driver 400 such that the support plate protrudes upwardly of the recovery vessels 320*a-d* when the substrate is loaded onto or unloaded from the support plate. In addition, when the process is in progress, the heights of the recovery vessels 320*a-d* are adjusted such that the treatment liquid flows into the predetermined recovery vessels 320*a-d* according to the type of the treatment liquid supplied to the substrate.

In the recovery vessels 320*a-d*, a first recovery vessel 320*a*, a second recovery vessel 320*b*, a third recovery vessel 320*c*, and a fourth recovery vessel 320*d* are sequentially disposed from the outermost side. The number of recovery vessels is not particularly limited.

In the moving assembly for a recovery guard, the lifting driver 400 is disposed in a set of two at symmetrical positions with respect to the center line of the substrate, for example, the center line C of the substrate support 310, and the lifting driver 400 is respectively connected to the plurality of recovery vessels 320*a-d*. For example, the first and second recovery vessels 320*a* and 320*b* are connected to the first and second lifting drivers 400*a* and 400*b*, and the third and fourth recovery vessels 320*c* and 320*d* are connected to the third and fourth lifting drivers 400*c* and 400*d*. The first and second lifting drivers 400*a* and 400*b* are disposed in symmetrical positions about the center line C.

The treatment liquid supply unit 330 supplies the treatment liquid to the substrate. The treatment liquid supply unit 330 is provided as a plurality of treatment liquid supply units 330, which may respectively supply different types of treatment liquids. The treatment liquid supply unit 330 may include a moving member and a nozzle. The moving member moves the nozzle to a process position and a stand-by position. In this case, the process position may be a position in which the nozzle faces the substrate supported by the substrate support 310, and the standby position may be a position in which the nozzle is out of the process position.

The moving member moving the nozzle of the treatment liquid supply unit 330 may include a support shaft, an arm, and a driver. The support shaft is located on one side within the chamber. The support shaft may have a rod shape extending in a vertical direction. The support shaft is provided to be rotatable by a driver. The support shaft may be provided to be able to move up and down. The arm is coupled to an upper end of the support shaft and may extend vertically from the support shaft. A nozzle is fixedly coupled to the end of the arm. As the support shaft rotates, the nozzle may swing along with the arm. The nozzle may be swing-moved to a process position and a stand-by position. Optionally, the arm may be provided for forward and backward movement in the longitudinal direction thereof. When viewed from above, the path along which the nozzle is moved may coincide with the center line (C) of the substrate in the process position.

In the present disclosure, the number of recovery vessels 320*a-d* is not limited to four, and two or more are sufficient. The lifting driver 400 has a configuration capable of operating the plurality of recovery vessels 320*a-d* with one driver 400, and operates the plurality of recovery vessels 320*a-d* in one position, to reduce the space occupied by the substrate processing apparatus 300.

In a limited space of the substrate processing apparatus 300, it is necessary to implement accurate lifting and lowering of the recovery vessels 320*a-d*. In the case of Patent Document 1, since the lifting and lowering of the recovery vessels 320*a-d* are implemented by an air cylinder and since the speed of raising the recovery vessels 320*a-d* on both sides is not the same, the recovery vessels 320*a-d* may be temporarily inclined, and as a result, foreign substances or device damage due to abrasion may occur. In addition, in the case of the air cylinder, the lifting width is limited, and thus, when the rotational speed of the substrate support 310 changes, an additional motor is disposed below the air cylinder to correspond to the rotational speed. In the case of an additional motor, it is necessary to secure an additional space within the substrate processing apparatus 300, and as a result, there is a limitation that the substrate processing apparatus 300 becomes large. The present disclosure provides a moving assembly for a recovery guard including a lifting driver 400, in which the size of the substrate processing apparatus 300 is reduced and the recovery vessels 320*a-d* may stably move and respond to rotational speeds, and a substrate processing apparatus 300 including the same.

Figure 3:
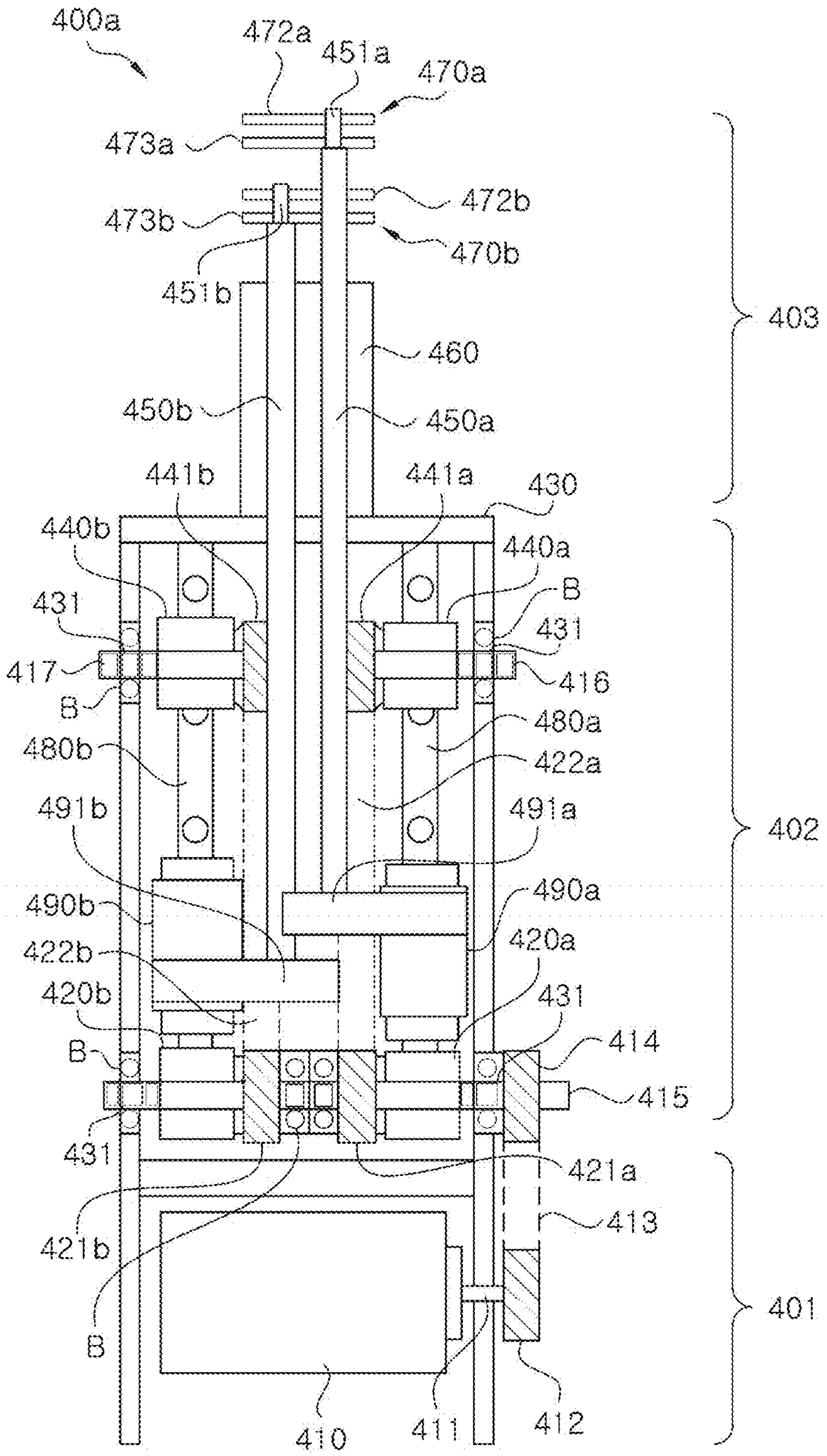
FIG. 3 is a schematic diagram of a lifting driver according to an embodiment.
Figure 4:
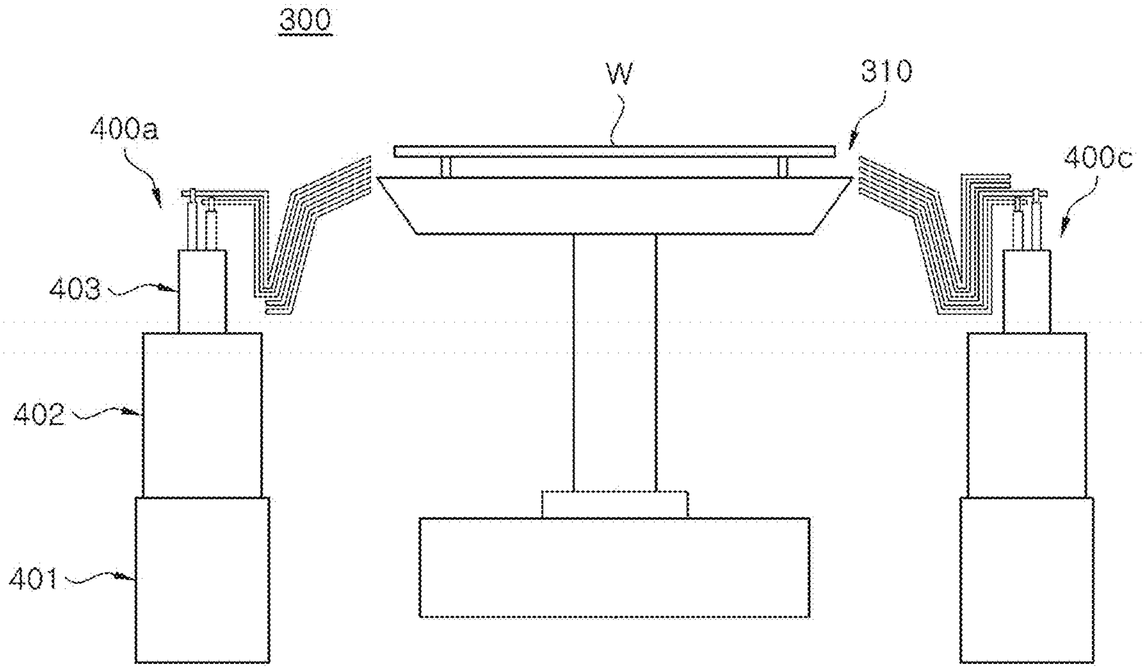
FIGS. 4 to 6 are schematic views illustrating the operation of a moving assembly for a recovery guard including the lifting driver of FIG. 3.
Figure 5:
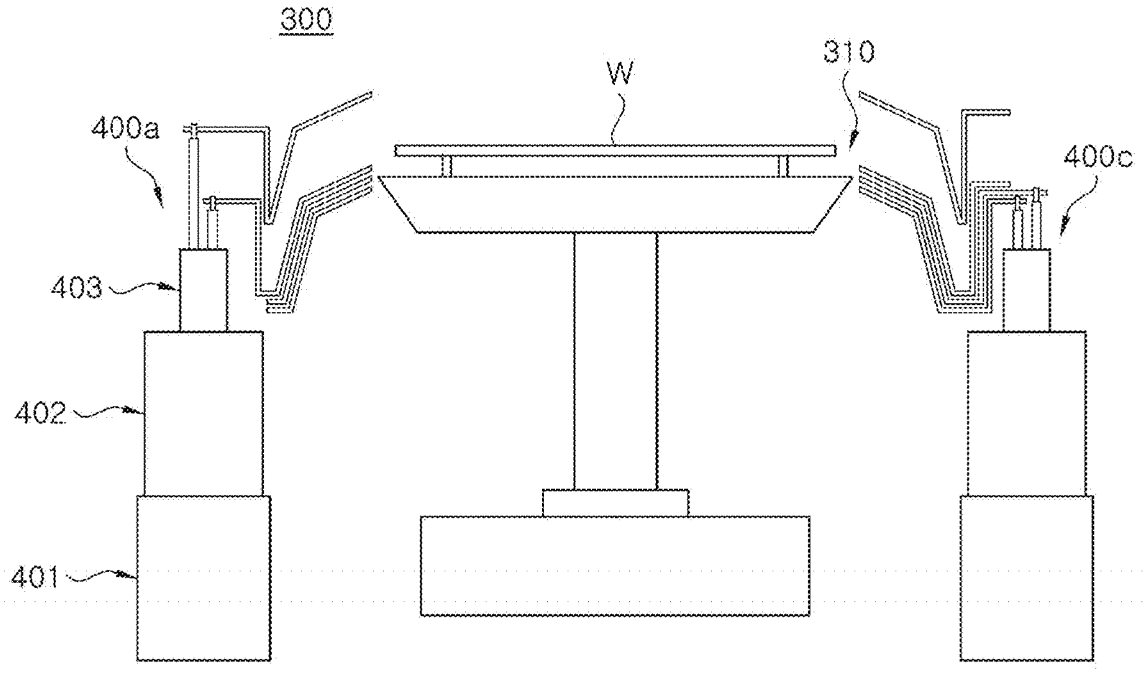
Figure 6:
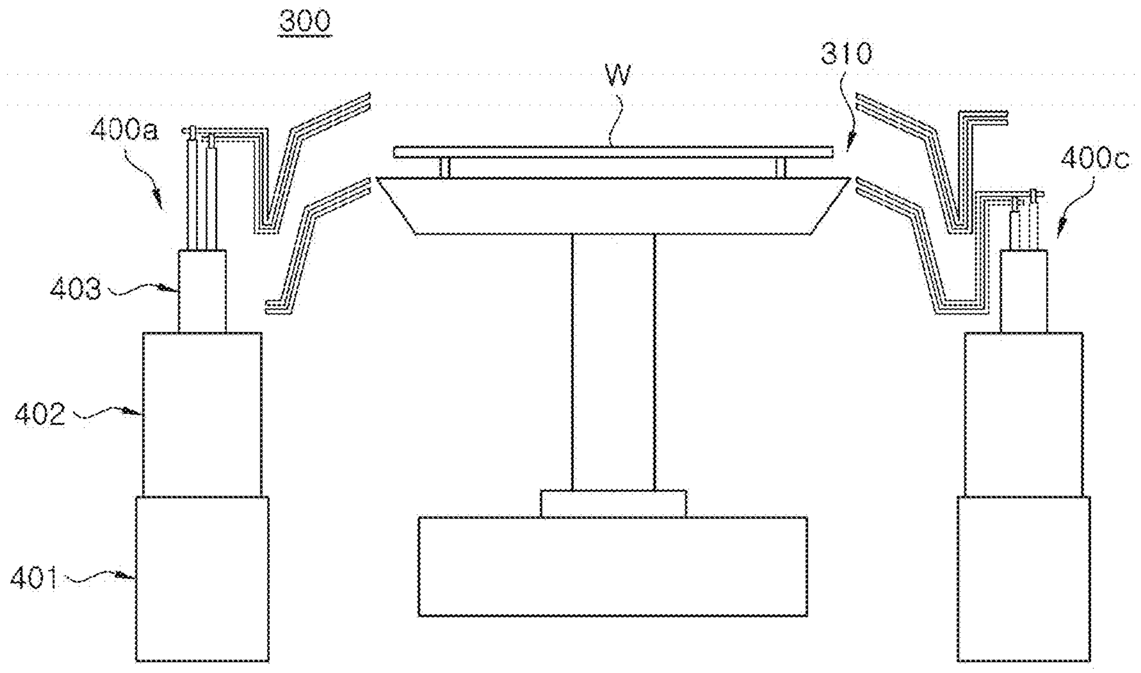

FIG. 3 is a schematic diagram of a lifting driver according to an embodiment, and FIGS. 4 to 6 are schematic diagrams of the operation of a moving assembly for a recovery guard including the lifting driver of FIG. 3.

Since the lifting driver 400 may have the same configuration as the first to fourth lifting drivers 400*a*, 400*b*, 400*c*, and 400*d*, one lifting driver 400 will be described as a reference.

The lifting driver 400 includes a power unit 401, a power conversion unit 402, and a moving unit 403, and in this embodiment, the power unit 401, the power conversion unit 402 and the moving unit 403 are continuously disposed in the vertical direction (a third direction).

The power unit 401 is a part that converts an electrical signal into a rotational force and provides a driving force required for elevation, and includes a motor. The power conversion unit 402 is a configuration that converts the rotational force of the motor into vertical movement, and in this embodiment, the power conversion unit 402 includes a belt and a pulley. The moving unit 403 includes a configuration connected to the recovery vessels 320*a-d* and moved by the vertical movement thereof in the power conversion unit 402, for example, includes a shaft and a recovery vessel connection unit connecting the shaft and the recovery vessel.

In detail, the lifting driver 400 includes a motor 410; drive shafts 411 and 415 connected to the motor 410 and rotated in a horizontal direction; a first shaft 450*a* connected to the first recovery vessel 320*a* (see FIG. 2) and extending vertically; a second shaft 450*b* connected to the second recovery vessel 320*b* (see FIG. 2) and extending in the vertical direction; a first clutch 420*a* connecting the drive shaft 411 and the first shaft 450*a*; and a second clutch 420*b* connecting the drive shaft 411 and the second shaft 450*b*.

In this embodiment, the rotation of the motor 410 is transmitted to the drive shafts 411 and 415, and whether to transfer the rotation of the drive shafts 411 and 415 to the shafts 450*a* and 450*b* through the first and second clutches 420*a* and 420*b* may be determined. Accordingly, since the plurality of shafts 450*a* and 450*b* may be driven by one motor 410, the space occupied by the lifting driver 400 may be significantly reduced. In addition, in the case of the motor 410, precise control is required to perform movement by an accurate distance. In the case of the clutches 420*a* and 420*b*, only On/Off control is sufficient, and control may also be simplified by reducing the number of parts requiring precise control.

The motors 410 are disposed in the lifting driver 400 one by one and cooperate with the clutches 420*a* and 420*b* to independently move the recovery vessels 320*a-d*. An encoder is connected inside or outside of the drive shafts 411 and 415 of the motor 410 to sense the rotation of the motor 410, and the motor 410, the encoder, and the clutches 420*a* and 420*b* are connected to a controller (not illustrated), and the controller (not illustrated) may detect the amount of rotation of the motors through the encoder to constantly control the ascending or descending speeds of the first lifting driver 400*a* and the second lifting driver 400*b*, and may synchronously control the plurality of lifting drivers 400*a* to *d*. The encoder may be an absolute type encoder to facilitate position tracking.

The motor 410 is disposed inside of the lower portion of a casing 430, and the power unit 401 includes the drive shaft 411 passing through the casing 430, a pulley 412 connected to the drive shaft 411, a belt 413 connected to the pulley 412, another pulley 414 connected to the belt 413, and a drive shaft 415 connected to the pulley 414. For example, the rotation of the motor 410 is transmitted as it is to another drive shaft 415 parallel to the drive shaft 411 through the pulleys 412 and 414 and the belt 413. In this case, the configuration for transmitting the rotation of the motor 410 is not essential, and the motor 410 may be directly connected to the drive shaft 415 depending on the space, and rotation may also be transmitted by a power transmission means other than the belt 413 and the pulleys 412 and 414.

The power conversion unit 402 is located inside of the casing 430, and a plurality of through-holes 431 are formed in the casing 430 to support a rotating shaft on which the pulleys rotate. A bearing B may be disposed in the through-hole 431.

The clutches 420*a* and 420*b* may be electromagnetic clutches, and be disposed on different positions around the drive shaft 415 to rotate together with the drive shaft 415, or to rotate only the drive shaft 415 without rotating the clutches 420*a* and 420*b*. For example, the clutches 420*a* and 420*b* are in close contact with the drive shaft 415 according to the signal and rotates together with the drive shaft 415, or allows the drive shaft 415 to rotate freely within the clutch.

The first clutch 420*a* is connected to the first pulley 421*a* to transmit or block rotation of the drive shaft 415 to the first pulley 421*a*, and the second clutch 420*b* is connected to the second pulley 421*b* to transmit or block the rotation of the drive shaft 415 to the second pulley 421*a*.

The first pulley 421*a* is connected to a first belt 422*a*, the first belt 422*a* is connected to a first shaft driving block 490*a* connected to the first shaft 450*a*, the second pulley 421*b* is connected to a second belt 422*b*, and the second belt 422*b* is connected to the second shaft driving block 490*b* connected to the second shaft 450*b*.

The first belt 422*a* is caught on the first pulley 421*a* and a third pulley 441*a* disposed at a position spaced upward from the first pulley 421*a*, and is moved according to the rotation of the first pulley 421*a*, and the second belt 422*b* is caught on the second pulley 421*b* and a fourth pulley 441*b* disposed at a position spaced upward from the second pulley 421*b*, and is moved according to the rotation of the second pulley 421*b*. The first and second belts 422*a* and 422*b* may be timing belts.

On the other hand, a portion of the first shaft driving block 490*a* is connected to the first belt 422*a* and another portion 491*a* thereof is connected to the first shaft 450*a*, and another portion is configured to move along an LM guide 480*a* extending up and down inside of the casing 430. Therefore, when the first belt 422*a* is moved, the first shaft driving block 490*a* moves upward or downward along the LM guide 480*a*, and as the first shaft driving block 490*a* moves, the first shaft 450*a* is also moved upward or downward.

Similarly, in the case of the second shaft driving block 490*b*, a portion thereof is connected to the first belt 422*a* and another portion 491*b* thereof is connected to the second shaft 450*b*. Another portion is configured to move along the LM guide 480*b* extending in the vertical direction inside of the casing 430. Therefore, when the second belt 422*b* is moved, the second shaft driving block 490*b* moves upward or downward along the LM guide 480*ab*, and as the second shaft driving block 490*b* moves, the second shaft 450*b* also moves upward or downward.

On the other hand, a first brake 440*a* is disposed on the rotating shaft 416 of the third pulley 441*a* rotated by the first belt 422*a*. The first brake 440*a* may be an electronic brake and is fixed to the casing 430. According to a signal, the first brake 440*a* is in close contact with the rotating shaft 416 and prevents the rotating shaft 416 from rotating, or allows the rotating shaft 416 to rotate freely.

Similarly, the second brake 440*b* is disposed on the rotating shaft 417 of the fourth pulley 441*b* rotated by the second belt 422*b*. The second brake 440*b* may be an electronic brake and is fixed to the casing 430. According to the signal, the second brake 440*b* is in close contact with the rotating shaft 417 to prevent the rotating shaft 417 from rotating, or may allow the rotating shaft 417 to rotate freely.

The first and second brakes 440*a* and 440*b* not only prevent movement of the shaft due to malfunction of the clutches 420*a* and 420*b*, but also prevent the movement of the shafts 450*a* and 450*b* in an emergency, and even if a failure occurs, problems due to scattering do not occur.

The first and second brakes 440*a* and 440*b* are also connected to the controller (not illustrated), and the controller controls the operation of the lifting driver 400 by connecting the first and second brakes 440*a* and 440*b* to the clutches 420*a* and 420*b*, the motor 410 and the encoder.

The first shaft 450*a* and the second shaft 450*b* extend in the vertical direction, and the end 451*a* of the first shaft 450*a* is connected to the first recovery vessel 320*a* through the first connecting portion 470*a*, and the end portion 451*b* of the second shaft 450*b* is connected to the second recovery vessel 320*b* through the second connecting portion 470*b*.

The first and second shafts 450*a* and 450*b* are connected to the first and second recovery vessels 320*a* and 320*b* through first and second connecting portions 470*a* and 470*b*. The first and second connecting portions 470*a* and 470*b* include first plates 472*a* and 472*b* having a substantially circular shape on a plane, and second plates 473*a* and 473*b* spaced apart from the first plates 472*a* and 472*b* in a vertical direction and having a shape corresponding to the first plates 472*a* and 472*b*. The first plates 472*a* and 472*b* and the second plates 473*a* and 473*b* include through-holes through which the first shaft 450*a* and the second shaft 450*b* pass, respectively. As the base of the first or second recovery vessel 320*a* or 320*b* is interposed and fastened between the first plate 472*a* or 472*b* and the second plate 473*a* or 473*b*, the shafts 450*a* and 450*b* are connected to the first and second recovery vessels 320*a* and 320*b*.

The first and second connecting portions 470*a* and 470*b* are concentrically disposed on a plane, and the through-hole through which the shaft passes is disposed in a position spaced apart from the center of the first and second connecting portions 470*a* and 470*b*. To this end, the second connecting portion 470*b* further includes a through-hole through which the first shaft 450*a* passes along with a through-hole connected to the second shaft 450*b*. Therefore, the lifting driver 400 according to an embodiment may drive the plurality of recovery vessels 320*a-d* by a pair of lifting drivers 400 located at a specific azimuth angle of the center line (C; see FIG. 2), and a space occupied by the substrate processing apparatus 300 may be significantly reduced.

Referring to FIGS. 4 to 6, an operation of elevating the first and second recovery vessels 320*a* and 320*b* by the lifting driver 400 will be described.

As illustrated in FIG. 4, when both the first and second recovery vessels 320*a* and 320*b* are on a lower side, the controller prevents the first and second recovery vessels 320*a* and 320*b* from moving by holding only the brakes 440*a* and 440*b* in a state in which the motor 410 of the lifting driver 400 is not operated.

As illustrated in FIG. 5, when the first recovery vessel 320*a* rises, the controller operates the motor 410 of the lifting driver 400, operates the first clutch 420*a* to rotate together with the drive shaft 415, stops the operation of the first brake 440*a*, does not operate the second clutch 420*b*, and operates the second brake 440*b*. Therefore, when the drive shaft 415 rotates according to the drive of the motor 410, the first pulley 421*a* is rotated by the first clutch 420*a*, and while the first belt 422*a* is moved by the rotation of the first pulley 421*a*, the first shaft 450*a* rises and the first recovery vessel 320*a* rises. At this time, the second brake 440*b* is operated and the second clutch 420*b* is not operated, and thus, the second pulley 421*b* does not rotate and the second shaft 450*b* does not move.

As illustrated in FIG. 6, when the second recovery vessel 320*b* rises, the first recovery vessel 320*a* should also rise, and thus, the controller operates the motor 410 of the lifting driver 400, operates the first clutch 420*a* to rotate together with the drive shaft 415, stops the operation of the first brake 440*a*, also operates the second clutch 420*b* to be rotated together with the drive shaft 415, and stops the operation of the second brake 440*b*. Therefore, when the drive shaft 415 rotates according to the drive of the motor 410, the first pulley 421*a* is rotated by the first clutch 420*a*. As the first belt 422*a* moves by the rotation of the first pulley 421*a*, the first shaft 450*a* rises and the first recovery vessel 320*a* rises. The second pulley 421*b* is rotated by the second clutch 420*b*, and as the second belt 422*b* moves by the rotation of the second pulley 421*b*, the second shaft 450*b* rises and the second recovery vessel 320*b* is elevated together with the first recovery vessel 320*b*.

As described above, the moving assembly for a recovery guard including the lifting driver 400 and the recovery vessels 320*a-d* according to an embodiment may perform accurate control while occupying a relatively small space.

Figure 7:
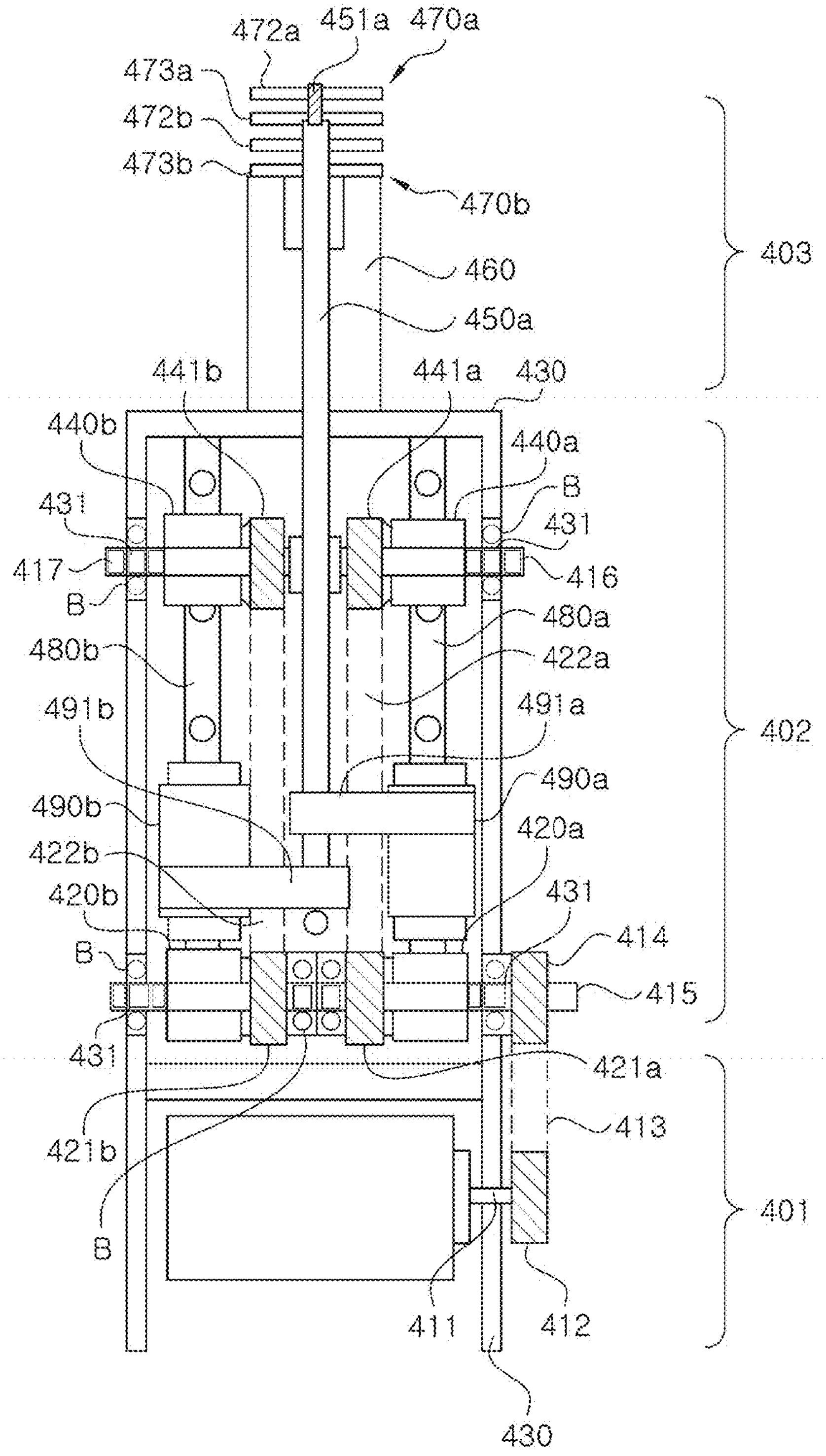
FIG. 7 is a schematic diagram of a lifting driver according to another embodiment.
Figure 8:
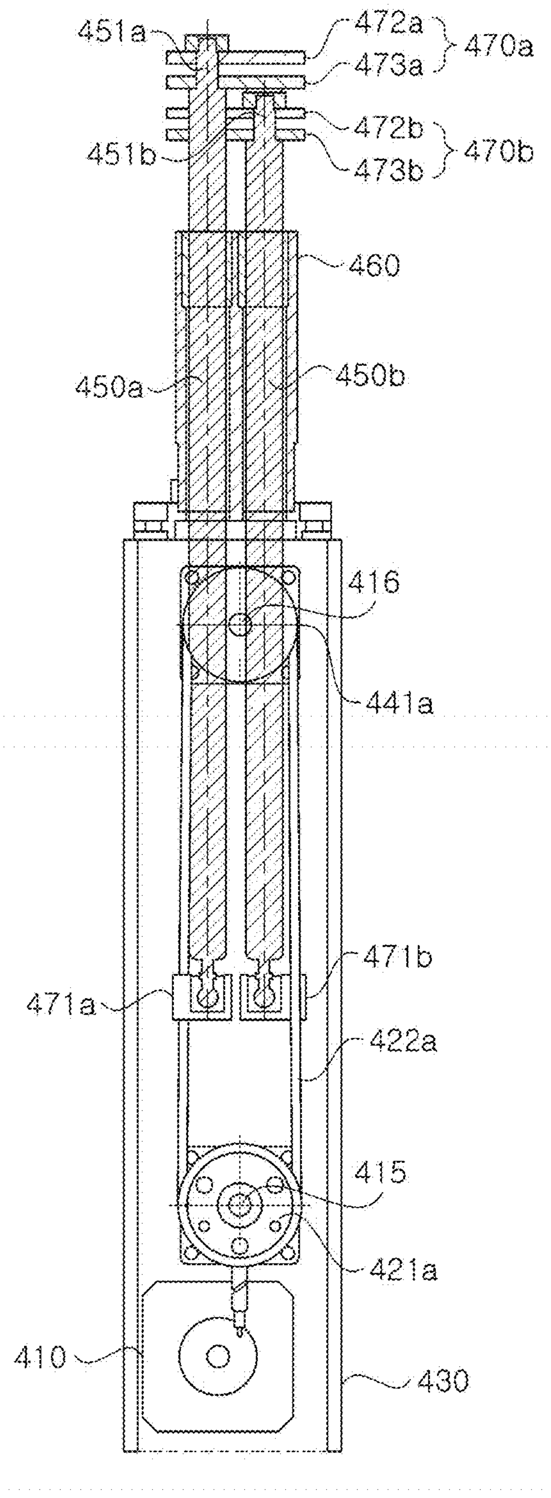
FIG. 8 is another schematic view of the lifting driver of FIG. 7.

FIG. 7 illustrates a schematic diagram of a lifting driver 400 of another embodiment, and FIG. 8 illustrates another schematic view of the lifting driver 400 of FIG. 7.

The lifting driver 400 according to the embodiment of FIGS. 7 and 8 includes one motor 410, two clutches 420*a* and 420*b*, and two brakes 440*a* and 440*b*, and has no difference from the lifting driver 400 of FIG. 3, in that the clutches 420*a* and 420*b* and the brakes 440*a* and 440*b* are connected to the first to fourth pulleys 421*a*, 421*b*, 441*a* and 441*b* through the belts 422*a* and 422*b*, and the first shaft driving block 490*a* and the second shaft driving block 490*b* are connected to the first and second belts 422*a* and 422*b*, respectively, and the description will focus on differences from the lifting driver 400 of FIG. 3.

In this embodiment, a portion 491*a* of the first shaft driving block 490*a* to which the first shaft 450*a* is connected is connected to the first shaft 450*a* through a floating joint, and a portion 491*b* of the second shaft driving block 490*b* to which the second shaft 450*b* is connected is also connected to the second shaft 450*b* through a floating joint. The floating joint has a spherical shape on the end of the drive block side of the shafts 450*a* and 450*b*, and the portions 491*a* and 491*b* of the first and second shaft driving blocks 490*a* and 490*b* have a shape that accommodates the spherical shape, thereby providing flexibility between the two linear components. For example, even if the operation of the shaft driving blocks 490*a* and 490*b* does not exactly match the vertical direction, the shafts 450*a* and 450*b* are guided by the bush 460, to be accurately moved in the vertical direction.

In addition, the first and second shafts 450*a* and 450*b* are disposed in a direction perpendicular to the drive shaft 415, and the first and second shafts 450*a* and 450*b* are positioned at the same azimuthal angle from the centerline C.

Figure 9:
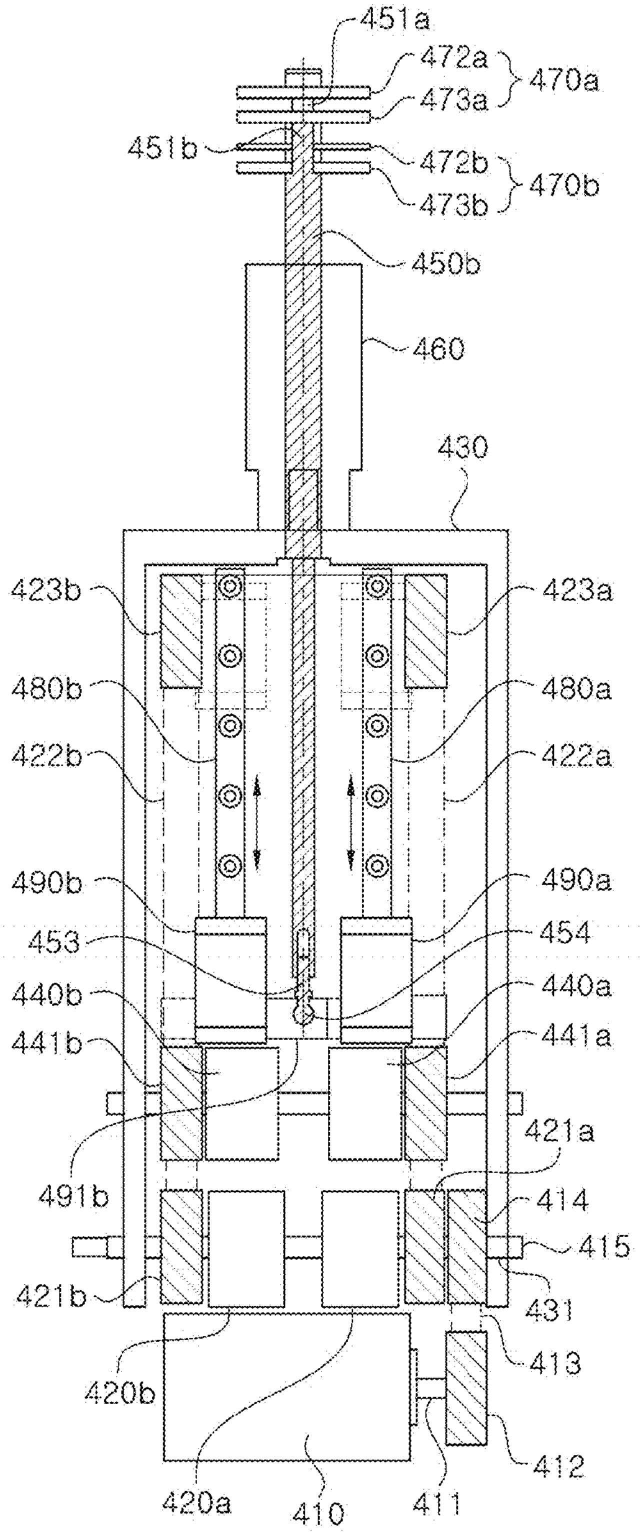
FIG. 9 is a schematic diagram of a lifting driver according to another embodiment.
Figure 10:
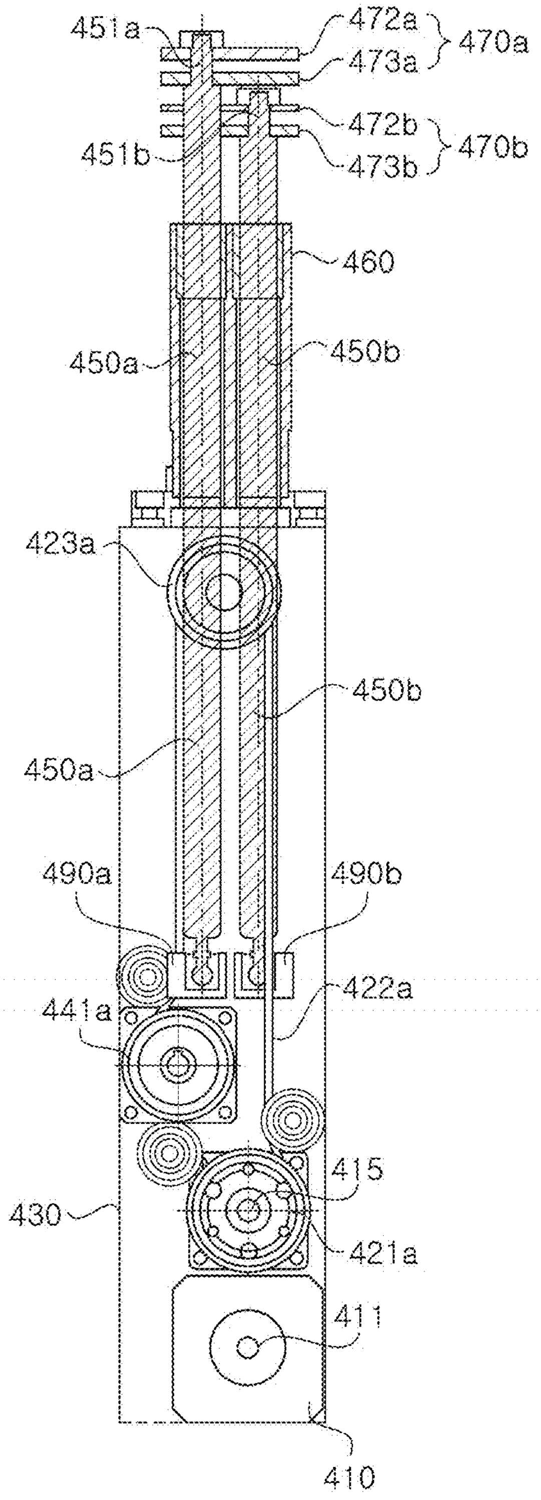
FIG. 10 is another schematic view of the lifting driver of FIG. 9.

FIG. 9 is a schematic diagram of a lifting driver of another embodiment, and FIG. 10 illustrates another schematic diagram of the lifting drive of FIG. 9.

The lifting driver 400 according to an embodiment of FIGS. 9 and 10 includes one motor 410, two clutches 420*a* and 420*b*, and two brakes 440*a* and 440*b*, and has no difference from the lifting driver 400 of FIG. 7, in that the clutches 420*a* and 420*b* and the brakes 440*a* and 440*b* are connected to the first to fourth pulleys 421*a*, 421*b*, 441*a* and 441*b* through the belts 422*a* and 422*b*, and the first shaft driving block 490*a* and the second shaft driving block 490*b* are connected to the first and second belts 422*a* and 422*b*, respectively, and the differences thereof from the lifting driver 400 of FIG. 7 will be mainly described.

In this embodiment, in the lifting driver 400, the first belt 422*a* is caught not only on the first pulley 421*a* and the third pulley 441*a* but also on the fifth pulley 423*a*, and the third pulley 441*a* connected to the first brake 440*a* is disposed adjacent to the first clutch 421*a* at a displaced position of the first clutch 421*a* in the vertical direction, and a fifth pulley 423*a* is positioned far from the first pulley 421*a*. For example, the third pulley 441*a* is disposed adjacent to the first pulley 421*a*, and the center of the third pulley 441*a* is positioned away from the line connecting the centers of the first pulley 421*a* and the fifth pulley 423*a*.

By this arrangement, a space in which the first shaft driving block 490*a* may move in the vertical direction may be secured, which lengthens the stroke of the first shaft 450*a* in the same space, thereby reducing the height occupied by the lifting driver 400 as a whole.

The second belt 422*b* is also caught not only on the second pulley 421*b* and the fourth pulley 441*b*, but also on the sixth pulley 423*b*, and the fourth pulley 441*b* connected to the second brake 440*b* is disposed adjacent to the second clutch 421*b* at a displaced position of the second clutch 421*b* in the vertical direction, and the sixth pulley 423*b* is located far from the second pulley 421*b*.

As set forth above, according to an embodiment, a moving assembly for a recovery guard and a substrate processing apparatus, which may be installed in a relatively narrow space, and are easily controlled through by the above configuration, may be provided.

While example embodiments have been illustrated and described above, it will be apparent to those skilled in the art that modifications and variations could be made without departing from the scope of the present disclosure as defined by the appended claims.

What is claimed is:

1. A moving assembly for a recovery guard, comprising:

a recovery vessel including a first recovery vessel disposed to surround a substrate support and a second recovery vessel disposed inside of the first recovery vessel, concentrically with respect to the first recovery vessel; and a lifting driver connected to the first and second recovery vessels and elevating the first and second recovery vessels, wherein the lifting driver includes a motor; a drive shaft connected to the motor and rotated in a first direction; a first shaft connected to the first recovery vessel and extending in a second direction, perpendicular to the first direction; a second shaft connected to the second recovery vessel and extending in the second direction; a first clutch connecting the drive shaft and the first shaft; and a second clutch connecting the drive shaft and the second shaft.

2. The moving assembly for a recovery guard of claim 1, wherein the first clutch is connected to a first pulley and transmitting or blocking rotation of the drive shaft to the first pulley, the second clutch is connected to a second pulley and transmitting or blocking the rotation of the drive shaft to the second pulley, the first pulley is connected to a first belt, and the first belt is connected to a first shaft driving block connected to the first shaft, and the second pulley is connected to a second belt, and the second belt is connected to a second shaft driving block connected to the second shaft.

3. The moving assembly for a recovery guard of claim 2, wherein the lifting driver further includes, a third pulley spaced apart from the first pulley in the second direction and connected to the first belt; and a fourth pulley spaced apart from the second pulley in the second direction and connected to the first belt.

4. The moving assembly for a recovery guard of claim 3, wherein the lifting driver further includes a casing in which the first to fourth pulleys and the drive shaft are disposed, wherein the casing has a plurality of through-holes formed in the first direction and supports the drive shaft and rotation shafts of the first to fourth pulleys.

5. The moving assembly for a recovery guard of claim 3, wherein the lifting driver further includes, a first brake disposed on a rotation shaft of the third pulley and a second brake disposed on a rotating shaft of the fourth pulley.

6. The moving assembly for a recovery guard of claim 2, wherein the first shaft driving block and the first shaft, and the second shaft driving block and the second shaft, are connected by a floating joint.

7. The moving assembly for a recovery guard of claim 2, wherein the lifting driver further includes, a first guide disposed adjacent to the first shaft driving block and extending in the second direction to guide the first shaft driving block to be moved in the second direction; and a second guide disposed adjacent to the second shaft driving block and extending in the second direction to guide the second shaft driving block to be moved in the second direction.

8. The moving assembly for a recovery guard of claim 5, wherein the motor includes a rotation shaft extending in the first direction, and the drive shaft is connected to the rotation shaft of the motor by a third belt.

9. The moving assembly for a recovery guard of claim 5, wherein the lifting driver includes a first lifting driver disposed on one side of the first and second recovery vessels and a second lifting driver disposed in a position symmetrical to the first lifting driver with respect to a center of the first recovery vessel; and the motors of the first and second lifting drivers are provided with encoders such that the first and second lifting drivers are synchronously controlled.

10. The moving assembly for a recovery guard of claim 1, wherein the lifting driver includes a first connecting portion connecting the first shaft and the first recovery vessel, and a second connecting portion connecting the second shaft and the second recovery vessel, wherein the second connecting portion includes a through-hole through which the first shaft passes, the first connecting portion and the second connecting portion are disposed concentrically in the second direction when viewed from the first direction, the first shaft is connected to a position spaced apart from a center of the first connecting portion, and the second shaft is connected to a position spaced apart from a center of the second connecting portion.

11. The moving assembly for a recovery guard of claim 3, wherein the lifting driver further includes, a fifth pulley rotated by the first belt and located farther from the first pulley than the third pulley in the second direction;

a sixth pulley rotated by the second belt and located farther from the second pulley than the fourth pulley in the second direction;

a first brake disposed on a rotating shaft of the third pulley; and a second brake disposed on a rotation shaft of the fourth pulley, wherein the third pulley is disposed adjacent to the first pulley, a center of the third pulley being located away from a line connecting centers of the first pulley and the fifth pulley, and the fourth pulley is disposed adjacent to the second pulley, a center of the fourth pulley being located at a position deviated from a line connecting centers of the second pulley and the sixth pulley.

12. A moving assembly for a recovery guard, comprising:

a recovery vessel including a first recovery vessel disposed to surround a substrate support, and a second recovery vessel disposed inside of the first recovery vessel while having the same centerline as a centerline of the first recovery vessel; and a lifting driver connected to the first and second recovery vessels and elevating the first and second recovery vessels, wherein the lifting driver includes a motor, a drive shaft connected to the motor and rotated in a first direction, a first shaft connected to the first recovery vessel and extending in a second direction, perpendicular to the first direction, a second shaft connected to the second recovery vessel and extending in the second direction, a first clutch connected to the drive shaft and transmitting or blocking rotation of the drive shaft, a second clutch connected to the drive shaft and transmitting or blocking rotation of the drive shaft, a first pulley connected to the first clutch, a second pulley connected to the second clutch, a third pulley disposed in a position spaced apart from the first pulley in the second direction, connected to the first pulley by a first belt, and rotated together therewith, a fourth pulley disposed in a position spaced apart from the second pulley in the second direction, connected to the second pulley by a second belt, and rotated together therewith, a first brake disposed on a rotation shaft of the third pulley, and a second brake disposed on a rotation shaft of the fourth pulley, and the lifting driver includes a first lifting driver disposed on one side of the first and second recovery vessels and a second lifting driver disposed in a position symmetrical to the first lifting driver with respect to the centerline.

13. The moving assembly for a recovery guard of claim 12, wherein the motors of the first and second lifting drivers are provided with encoders installed thereon such that the first and second lifting drivers are synchronously controlled.

14. The moving assembly for a recovery guard of claim 13, wherein the first and second brakes are electromagnetic brakes, the first and second clutches are electromagnetic clutches, the moving assembly for a recovery guard further comprising a controller connected to the first and second brakes, the first and second clutches, and the motor.

15. The moving assembly for a recovery guard of claim 14, wherein the first pulley is connected to a first belt, and the first belt is connected to a first shaft driving block connected to the first shaft, and the second pulley is connected to a second belt, and the second belt is connected to a second shaft driving block connected to the second shaft.

16. The moving assembly for a recovery guard of claim 14, wherein the first shaft driving block and the first shaft, and the second shaft driving block and the second shaft, are connected by a floating joint.

17. The moving assembly for a recovery guard of claim 12, wherein the lifting driver further includes, a fifth pulley rotated by the first belt and located farther from the first pulley than the third pulley in the second direction; and a sixth pulley rotated by the second belt and located farther from the second pulley than the fourth pulley in the second direction, the third pulley is disposed adjacent to the first pulley, a center of the third pulley being located away from a line connecting centers of the first and fifth pulleys, and the fourth pulley is disposed adjacent to the second pulley, a center of the fourth pulley being located in a position deviated from a line connecting centers of the second pulley and the sixth pulley.

18. The moving assembly for a recovery guard of claim 12, wherein the first and second shafts are disposed at the same azimuthal angle from the centerline.

19. A substrate processing apparatus comprising:

a substrate support rotating while supporting a substrate;

a treatment liquid supply unit supplying a treatment liquid to the substrate; and a moving assembly for a recovery guard, including a recovery vessel recovering the treatment liquid scattered from the substrate, and a lifting driver connected to the recovery vessel and elevating the recovery vessel, wherein the recovery vessel includes a first recovery vessel surrounding the substrate support, a second recovery vessel disposed inside of the first recovery vessel concentrically with respect to the first recovery vessel, a third recovery vessel disposed inside of the second recovery vessel concentrically with respect to the first recovery vessel, and a fourth recovery vessel disposed inside of the third recovery vessel concentrically with respect to the first recovery vessel, the lifting driver includes a first lifting driver connected to the first and second recovery vessels, a second lifting driver disposed in a position symmetrical to the first lifting driver with respect to a centerline of the recovery vessel on a plane and connected to the first and second recovery vessels, a third lifting driver connected to the third and fourth recovery vessels, and a fourth lifting driver disposed in a position symmetrical to the third lifting driver with respect to a centerline of the recovery vessel and connected to the third and fourth recovery vessels, and the first to fourth lifting drivers include a motor, a drive shaft connected to the motor and rotated in a first direction, a first shaft connected to the first recovery vessel and extending in a second direction, perpendicular to the first direction, a second shaft connected to the second recovery vessel and extending in the second direction, a first clutch connecting the drive shaft and the first shaft, and a second clutch connecting the drive shaft and the second shaft.

20. The substrate processing apparatus of claim 19, wherein the lifting driver further includes, a third pulley spaced apart from the first pulley in the second direction and connected to the first belt;

a fourth pulley disposed apart from the second pulley in the second direction and connected to the first belt;

a first brake disposed on a rotating shaft of the third pulley; and a second brake disposed on a rotating shaft of the fourth pulley.

* * * * *